(No Model.) 2 Sheets—Sheet 1.
B. H. TYSON.
Cotton and Hay Press.
No. 233,447. Patented Oct. 19, 1880.
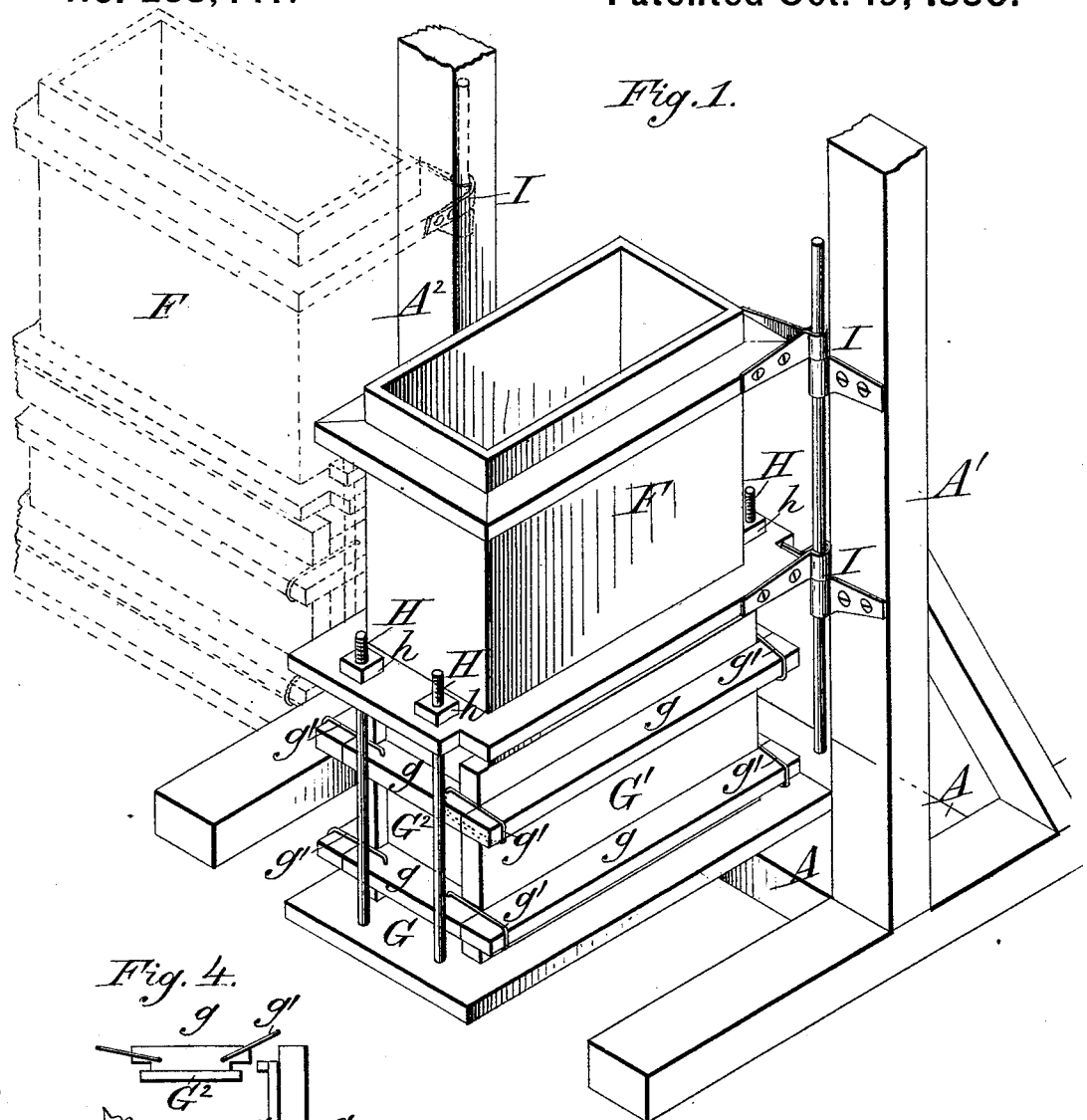
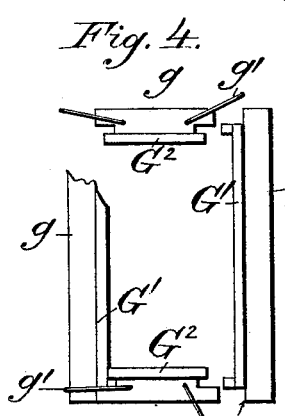
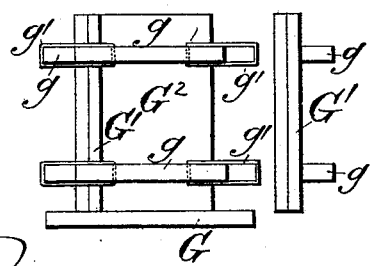
Attest:
F. H. Schott
C. M. Connell
Inventor:
Benjamin H. Tyson
Per Jas. M. Blanchard
Attorney.

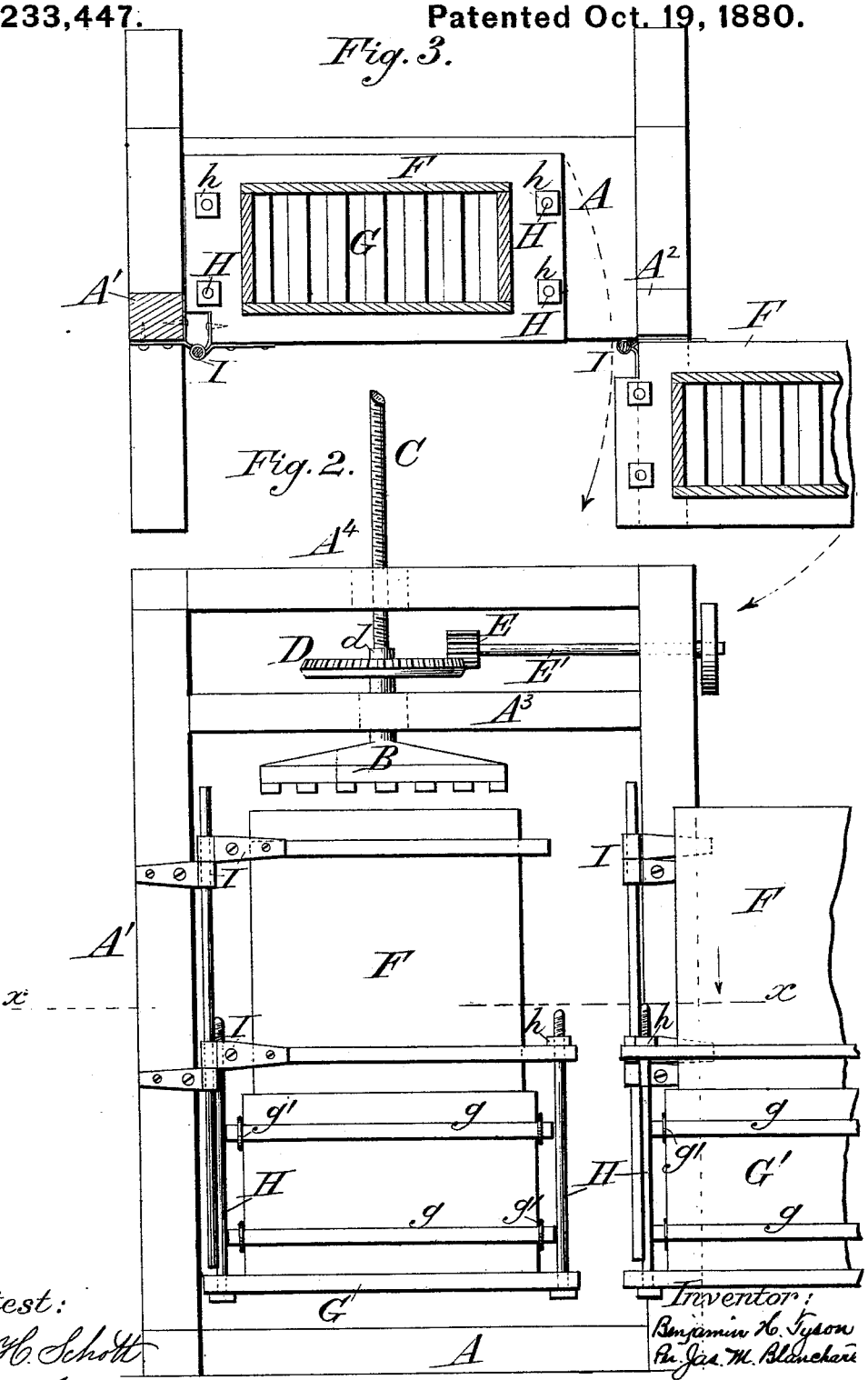

UNITED STATES PATENT OFFICE.

BENJAMIN H. TYSON, OF WILSON, NORTH CAROLINA.

COTTON AND HAY PRESS.

SPECIFICATION forming part of Letters Patent No. 233,447, dated October 19, 1880.

Application filed August 14, 1880. (No model.)

*To all whom it may concern:*

Be it known that I, BENJAMIN H. TYSON, a citizen of the United States, residing at Wilson, in the county of Wilson and State of North Carolina, have invented certain new and useful Improvements in Cotton and Hay Presses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to upright cotton and hay presses, comprising independent boxes for the reception of the material to be baled and a movable platen for compressing the same in said boxes.

The improvement consists in making the lower sections of the boxes vertically adjustable on the upper sections, so that they may be raised sufficiently to have their bottoms clear the fixed bed of the frame in being conveyed in or out, and lowered to have them rest solidly on such bed when the pressure is applied, and thus prevent strain upon the hinges; and it further consists in constructing the lower sections of the boxes with removable sides and ends, which, when the material has been compressed and while it is still under pressure, may be removed, so that the bagging may be properly sewed around the bale and the ties applied; and, further, in certain combinations of some of the parts of which the press is composed.

The manner in which I carry out the objects of my invention is illustrated in the accompanying drawings, in which—

Figure 1 is a perspective view, showing two hinged press-boxes, one in full and the other in dotted lines, and the lower portion of the frame of the press. Fig. 2 is a front elevation of the press, showing one of the boxes in position under the platen and the other swung outward. Fig. 3 is a horizontal section on line $x\,x$ of Fig. 2, and Figs. 4 and 5 are detail views of the lower section of one of the boxes.

Similar letters refer to similar parts throughout the several views.

In constructing cotton and hay presses in accordance with my improvement there is provided a solid bed, A, secured to suitable cross-sills, on which the uprights A' A² are erected, steadied by suitable braces on the rear side and connected on top by cross-beams A³ and A⁴. A platen, B, cross-grooved as usual, is carried by a traveling screw, C, which slides in suitable bearings on the cross-beams, and is operated by the internally screw-threaded hub $d$ of the bevel-wheel D, so mounted that it can freely rotate but cannot move in the axial line of the screw. This bevel-wheel is operated by a pinion, E, on a horizontal shaft, E', which is carried in bearings on the frame, and may be turned by a crank or pulley.

To each of the posts A' and A² of the frame there is hinged a box, in which the cotton, hay, or other material to be pressed is placed. These boxes each consist of a rectangular section, F, with permanently connected sides and ends, and a lower section composed of the bottom G, the sides G' G', and the ends G². The bottom is cross-grooved to correspond with the under surface of the platen, so as to provide for the application of the bands or ties around the bale, and is suspended from the upper section, F, of the box by suspension-rods H, the screw-threaded upper ends of which are provided with nuts or thumb-screws $h$, by means of which the said bottom may be raised and lowered to the required extent. The sides and ends of these lower sections of the boxes are removably connected and provided with stout horizontal bars $g$, of which those on the sides overlap those on the ends, so that links $g'$, pivoted to the bars on the ends, may be slipped over the side bars to hold said sides and ends firmly together in charging and pressing. These boxes, constructed as described, are, as above stated and as clearly shown in the drawings, attached by hinges I to the posts or uprights of the frame. This is done in such a manner that they may be swung horizontally from between the uprights and away from under the platen when they are to be charged. The hinges are all applied to the upper sections, F, of the boxes, so as not to interfere with the manipulation and adjustment of the lower sections. This is preferable, although suitable hinges could be applied in part to the upper and in part to the lower sections.

The boxes are so proportioned that in compressing the platen will descend below the lower end of the upper section, so that the whole bale will be exposed when the lower section is opened, in order that it may be properly bagged and tied, and also expelled after it has been relieved from the pressure of the platen.

By the use of two press-boxes I greatly facilitate the packing of cotton and other substances, as while the contents of one are being compressed by the platen the other can be filled, and thus double the quantity of material can be packed in the same time consumed by the ordinary single-box press.

The boxes are made entirely independent of each other, in order that any derangement of one of them may not interfere with the use of the other, and that the press can be kept in operation with such other. The independence of the press-boxes is a feature by which this part of my invention is clearly distinguished from presses having a swinging box containing several chambers.

The operation of my improved press is as follows: The boxes having been constructed as shown and described, the upper ends of the lower sections are a little parted from the lower ends of the upper sections. To get ready for charging, the lower sections are raised slightly by turning the nuts or thumb-screws on the suspension-rods to lift them above the bed A. One of the boxes is then filled with the material to be compressed and swung into position under the platen and made fast by any suitable means; but before the platen is brought into operation the lower section of the box is lowered to cause its bottom to rest solidly upon the bed A. The platen is then moved downward into the box and the necessary pressure applied to the material therein. While this is being done the other box is filled.

When the material in the first box is sufficiently compressed the sides and ends of the lower section of said box are successively removed, the bagging sewed around the bale, and the bands applied and fastened, all while the bale remains under pressure. The platen is then raised, the bale expelled, the sides and ends replaced upon the lower section, the bottom raised off the bed, and the box swung outward and filled while the other is placed in position and the material within it compressed in like manner, and so on continuously, one box being filled while the contents of the other are being compressed and baled.

Although I have provided for the use of two press-boxes, it is obvious that one may be dispensed with, if desirable, without affecting the operation of packing.

Having thus described my invention, what I claim, and desire to secure by Letters Patent, is—

1. A swinging box for an upright cotton and hay press, composed of a permanent upper section and a vertically-adjustable lower section, substantially as and for the purpose described.

2. A swinging box for an upright cotton and hay press, composed of a permanent upper section and a vertically-adjustable lower section, constructed with removable sides and ends, substantially as and for the purpose set forth.

3. The combination, substantially as before set forth, of the fixed bed and one or more swinging boxes having permanent upper sections and vertically-adjustable lower sections.

In testimony whereof I affix my signature in presence of two witnesses.

BENJAMIN H. TYSON.

Witnesses:
T. C. DAVIS,
J. G. RAWLS.